United States Patent
Shahana et al.

(10) Patent No.: US 7,152,498 B2
(45) Date of Patent: Dec. 26, 2006

(54) BICYCLE CONTROL CABLE FIXING DEVICE

(75) Inventors: Satoshi Shahana, Osaka (JP); Yo Matsubayashi, Sakai (JP); Kanji Kirimoto, Kaizuka (JP)

(73) Assignee: Shimano Inc., Osaka (JP)

( * ) Notice: Subject to any disclaimer, the term of this patent is extended or adjusted under 35 U.S.C. 154(b) by 375 days.

(21) Appl. No.: 10/725,370

(22) Filed: Dec. 3, 2003

(65) Prior Publication Data

US 2005/0120822 A1    Jun. 9, 2005

(51) Int. Cl.
*F16C 1/22* (2006.01)
(52) U.S. Cl. .................................................. 74/502.6
(58) Field of Classification Search ............... 74/502.6, 74/500.5; 474/69, 80, 82
See application file for complete search history.

(56) References Cited

U.S. PATENT DOCUMENTS

| 2,428,166 A | 9/1947 | Letourneur |
| 2,431,513 A | 11/1947 | Schwinn |
| 4,059,871 A | 11/1977 | Swager |
| 4,601,682 A | 7/1986 | Nagano |
| 4,840,605 A | 6/1989 | Testa |
| 5,163,881 A | 11/1992 | Chattin |

FOREIGN PATENT DOCUMENTS

| DE | 4425157 A1 | 1/1996 |
| DE | 4427772 A1 | 2/1996 |
| EP | 0540002 A1 | 5/1993 |
| EP | 0766014 A1 | 4/1997 |
| EP | 1055597 A2 | 11/2000 |

*Primary Examiner*—Vicky A. Johnson
(74) *Attorney, Agent, or Firm*—Global IP Counselors, LLP

(57) ABSTRACT

A control cable fixing device is coupled to a bicycle component such as a rear derailleur in order to secure an inner wire of a control cable to the bicycle component. The control cable fixing device includes a support member with a first engagement surface and a cable fixing member with a second engagement surface. The cable fixing member is rotatable relative to the support member. The cable fixing member and the support member secure the inner wire between the engagement surfaces in response to rotational movement of the cable fixing member to a cable fixing position. The cable fixing member preferably includes a cam portion and a lever portion that is manually operable to rotate the cable fixing member.

31 Claims, 12 Drawing Sheets

BICYCLE CONTROL CABLE FIXING DEVICE

BACKGROUND OF THE INVENTION

1. Field of the Invention

This invention generally relates to a control cable fixing device for a bicycle component. More specifically, the present invention relates to a control cable fixing device for a bicycle rear derailleur, which is manually operable from the upper side of the rear derailleur.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned over the years is the rear derailleur of the bicycle.

Typically, a rear derailleur has a base member and a chain guide movably coupled to the base member via a linkage assembly. The base member is coupled to the rear triangle of the frame of the bicycle. The chain guide is configured to move the chain laterally over a plurality of rear sprockets. A spring typically biases the chain guide to an innermost or outermost position relative to the rear sprockets. A bowden-type control cable with an outer sheath and an inner wire is typically coupled to the rear derailleur and to a conventional shift control device.

The outer casing of the control cable is typically received in a recess of the base member, while the inner wire is fixedly coupled to the linkage assembly to move the chain guide against the biasing force of the spring. The inner wire is typically coupled to the outer, lower area of the linkage assembly with a cable fixing plate and a cable fixing bolt that is threadedly coupled to the linkage assembly. The cable fixing bolt is tightened with a tool such as a hexagonal wrench or screwdriver to squeeze the inner wire between the cable fixing plate and the linkage assembly. Thus, the chain guide can be moved laterally by moving the linkage assembly via the inner wire. Pulling the inner wire moves the chain guide against the biasing force of the spring, while releasing the inner wire causes the chain guide to move due to the biasing force of the spring.

While these typical rear derailleurs usually work very well, there are drawbacks with these rear derailleurs. In particular, when these typical rear derailleurs are used in extreme riding conditions such as "extreme mountain biking", "downhill riding", etc., debris such as brush and trees can catch the control cable and control cable fixing mechanism. This can adversely affect shifting performance in some situations. Additionally, it can be difficult to fix the inner wire to the linkage assembly with a hexagonal wrench or screwdriver due to the location of the cable fixing bolt relative to the bicycle.

In view of the above, it will be apparent to those skilled in the art from this disclosure that there exists a need for a bicycle component with an improved bicycle control cable fixing device. This invention addresses this need in the art as well as other needs, which will become apparent to those skilled in the art from this disclosure.

SUMMARY OF THE INVENTION

One object of the present invention is to provide a bicycle component with a control cable fixing device that reliably, non-movably couples a bicycle control cable to the bicycle component.

Another object of the present invention is to provide a bicycle component with a control cable fixing device that is manually operable, i.e., without the use of a tool such as a hexagonal wrench or screwdriver.

Yet another object of the present invention is to provide a bicycle component with a control cable fixing device that reduces debris such as brush and trees catching on the bicycle component and/or the control cable fixing device of the bicycle component.

Still another object of the present invention is to provide a bicycle component with a control cable fixing device that is relatively simple and inexpensive to manufacture and assemble, yet relatively lightweight.

The foregoing objects can basically be attained by providing a bicycle control cable fixing device adapted to be coupled to a bicycle component. The bicycle control cable fixing device comprises a support member and a cable fixing member. The support member has a first cable engagement surface. The cable fixing member is non-threadedly supported on the support member to rotate about a rotation axis. The cable fixing member has a second cable engagement surface. The cable fixing member and the support member are arranged and configured such that an inner wire of a bicycle control cable is secured between the first and second cable engagement surfaces in response to rotational movement of the cable fixing member to a cable fixing position from a cable release position.

The foregoing objects can also basically be attained by providing a bicycle component that comprises a first member and a second member with a bicycle control cable fixing device. The first member is adapted to be coupled to a bicycle. The first member includes a cable housing receiving recess adapted to receive an outer casing of a bicycle control cable. The second member is movably coupled relative to the first member. The second member includes the bicycle control cable fixing device fixedly coupled thereto. The bicycle control cable fixing device is configured to non-movably retain an inner wire of the bicycle control cable thereto such that movement of the inner wire moves the second member relative to the first member. The bicycle control cable fixing device includes a support member and a cable fixing member. The support member has a first cable engagement surface. The cable fixing member is non-threadedly supported on the support member to rotate about a rotation axis. The cable fixing member has a second cable engagement surface. The cable fixing member and the support member are arranged and configured such that the inner wire of the bicycle control cable is secured between the first and second cable engagement surfaces in response to rotational movement of the cable fixing member.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
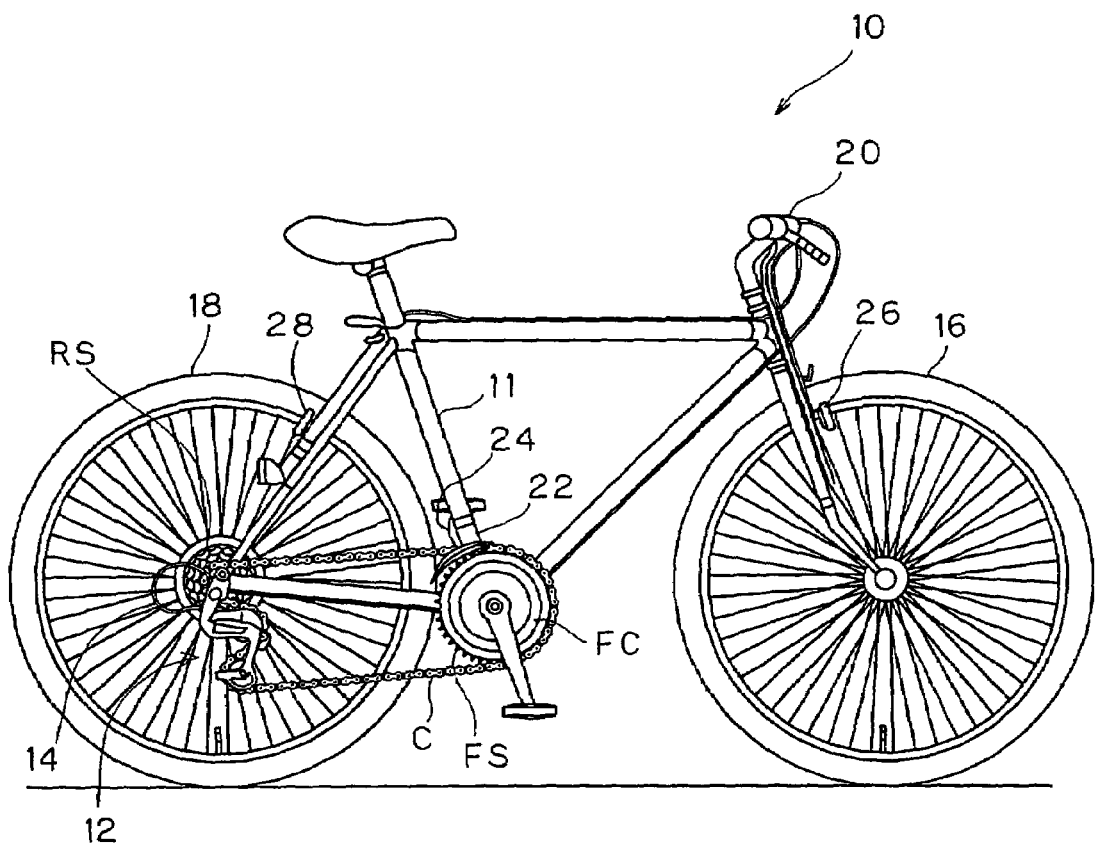
FIG. 1 is a side elevational view of bicycle equipped with a rear derailleur (component) having a control cable fixing device in accordance with a first embodiment of the present invention.
Figure 2:
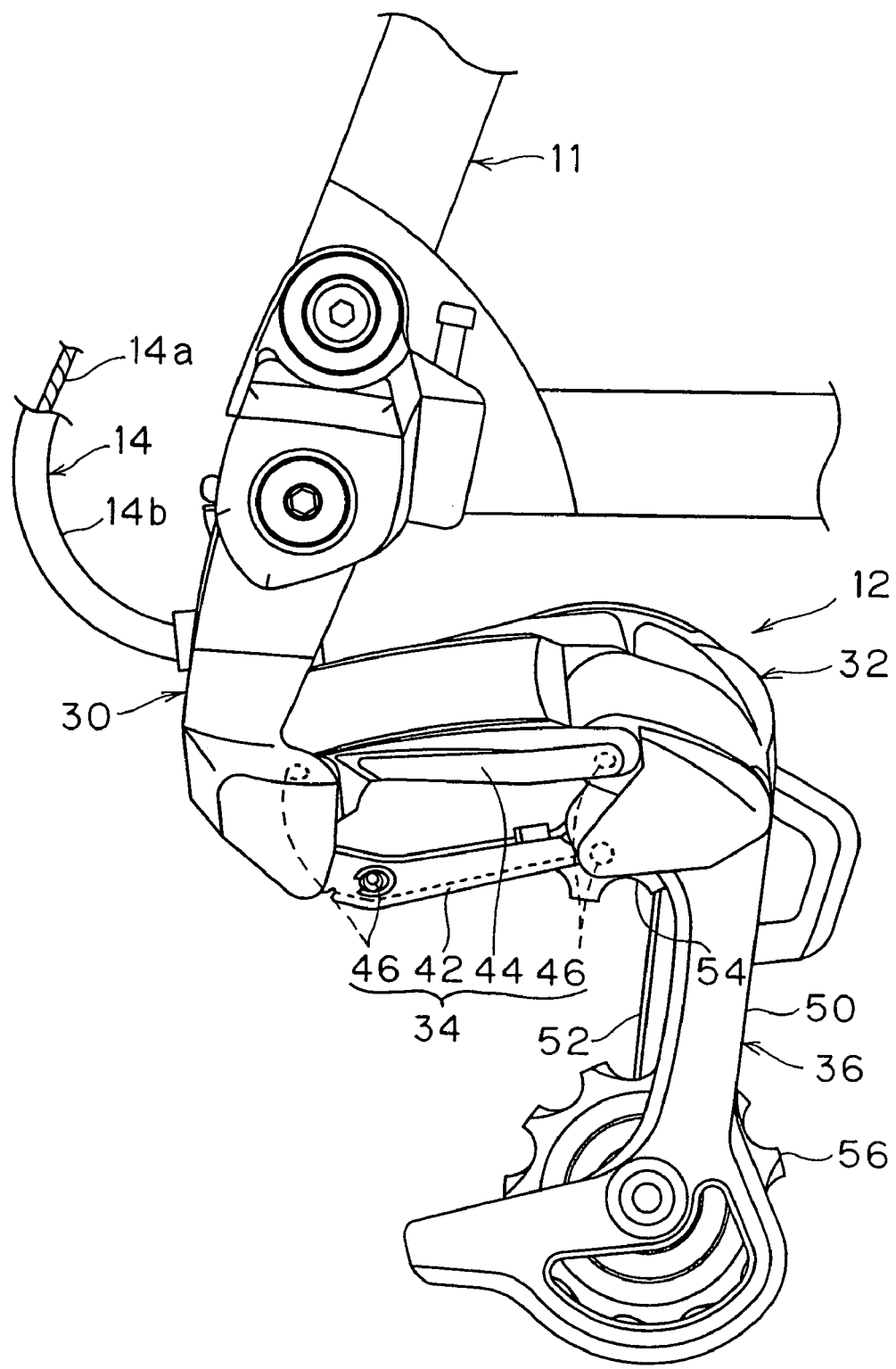
FIG. 2 is an enlarged, side elevational view of the rear derailleur illustrated in FIG. 1, with portions of the bicycle removed for the purpose of illustration.
Figure 3:
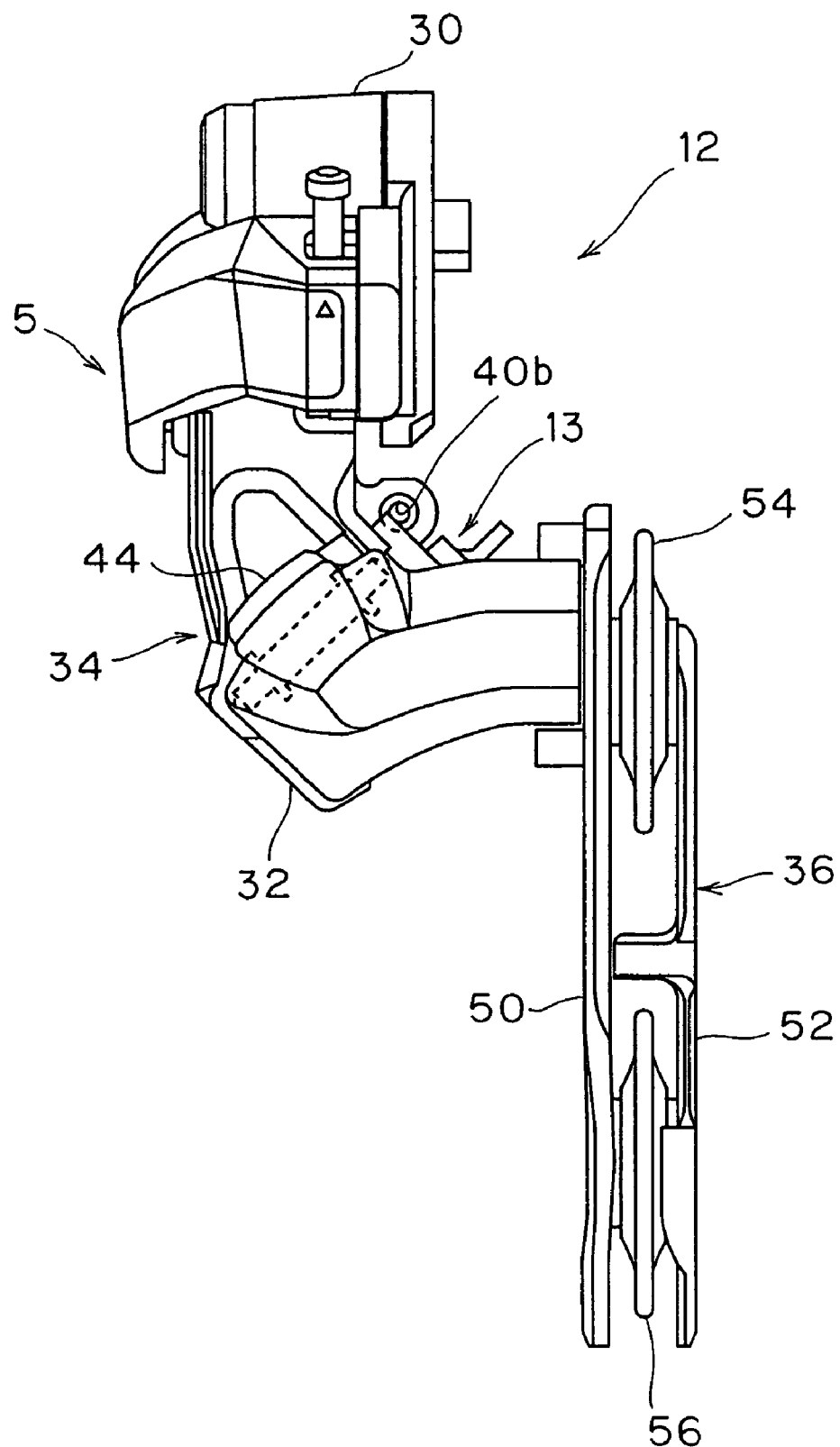
FIG. 3 is a front elevational view of the rear derailleur illustrated in FIG. 2, with the rear derailleur removed from the bicycle for the purpose of illustration.
Figure 4:
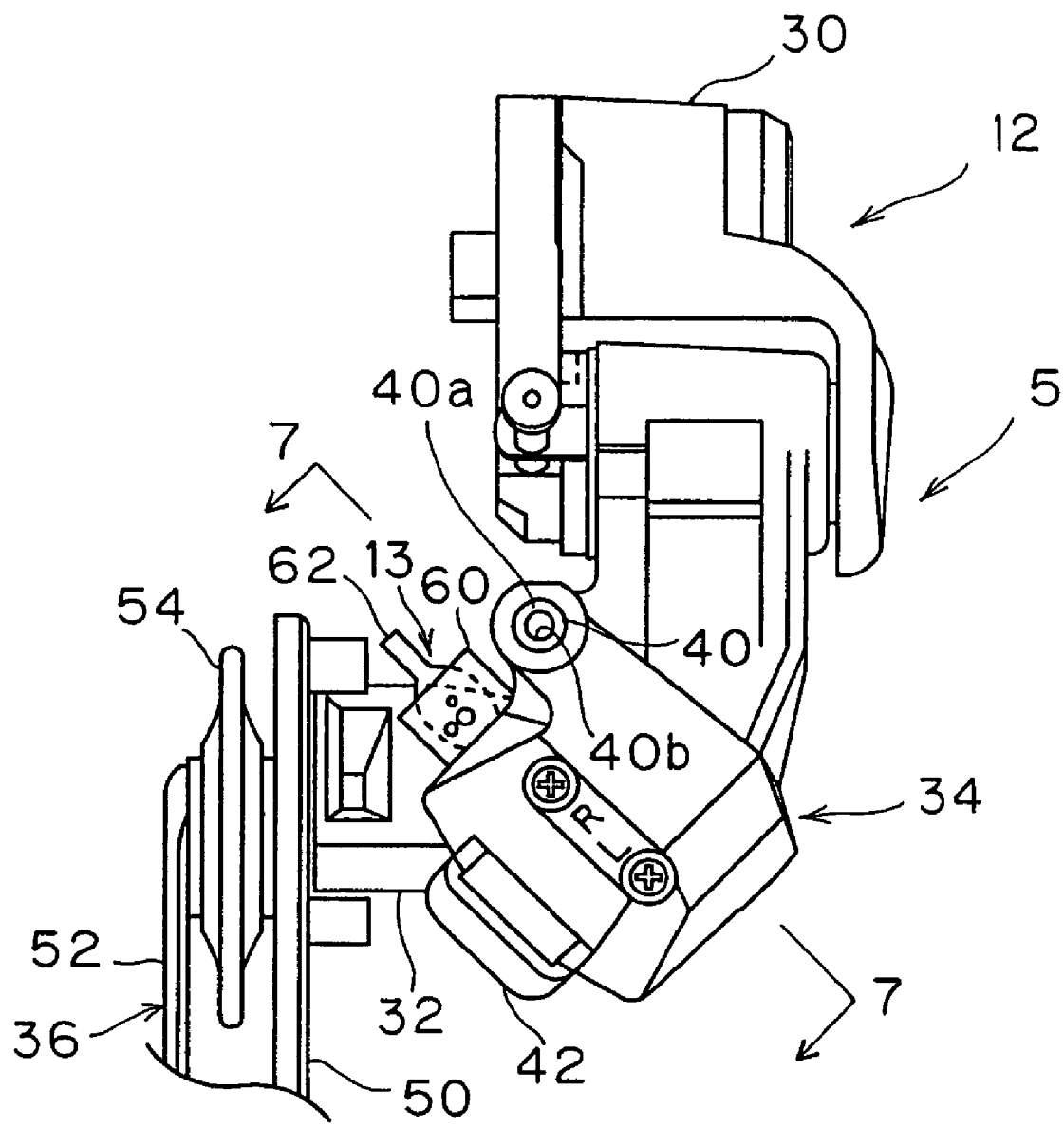
FIG. 4 is a partial, rear elevational view of the rear derailleur illustrated in FIGS. 2 and 3, with the rear derailleur removed from the bicycle for the purpose of illustration.
Figure 5:
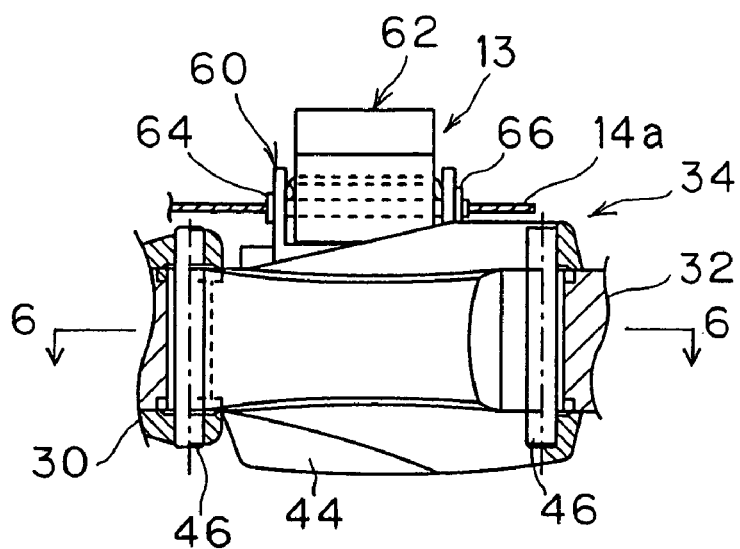
FIG. 5 is a partial inclined elevational view of the rear derailleur illustrated in FIGS. 2–4, illustrating the linkage assembly of the rear derailleur with the control cable fixing device coupled thereto.

Referring initially to FIG. 1, a bicycle 10 is illustrated with a rear derailleur 12 (bicycle component) coupled thereto in accordance with a first embodiment of the present invention. The rear derailleur 12 is designed such that a control cable 14 can be manually fixed thereto without the use of tools. Moreover, the rear derailleur 12 is designed with the attachment point of the control cable 14 arranged in a location that reduces interference from debris while riding the bicycle 10. Specifically, the rear derailleur 12 includes a control cable fixing device 13 for fixing the control cable 14 thereto in accordance with the first embodiment of the present invention. The control cable fixing device 13 is manually operable and arranged in an optimal location to prevent interference from debris.

The bicycle 10 is conventional, except for the rear derailleur 12 having the control cable fixing device 13. Thus, the bicycle 10 will not be discussed and/or illustrated in detail herein, except as related to the rear derailleur 12. The bicycle 10 basically includes a frame 11 with front and rear wheels 16 and 18 coupled to the frame 11 in a conventional manner. The frame 11 includes a front fork pivotally coupled thereto with a handle bar coupled to the front fork in a conventional manner to steer the front wheel 16. The rear wheel 18 is coupled to the rear triangle of the frame 11.

A rear shift control device 20 is mounted on the handlebar to control the rear derailleur 12 via the control cable 14 in a relatively conventional manner to move a chain C laterally over a plurality of rear sprockets RS that are coupled to the rear wheel 18. The rear sprockets RS are coupled to the rear wheel 18 via a free wheel to selectively rotate the rear wheel 18 via the chain C in order to propel the bicycle 10 in a conventional manner. A front crank FC with a plurality of front sprockets FS coupled thereto is coupled to the frame 11 to cycle the chain C, and thus, to propel the bicycle 10. Preferably a front derailleur 22 with a front shift control cable 24 coupled thereto is coupled to the frame 11 in order to shift the chain C laterally over the front sprockets FS in a conventional manner.

Front and rear brake mechanisms 26 and 28 are coupled to the frame 11 to apply braking forces to the rims of the front and rear wheels 16 and 18, respectively, in a conventional manner. A front shift control mechanism (not shown) is also preferably coupled to the handlebar to control the front derailleur 22 to shift the chain C laterally over the front sprockets FS. The rear shift control mechanism 20 preferably includes a brake lever pivotally coupled thereto to control the rear brake mechanism 28 in a conventional manner. The front shift control mechanism (not shown) also preferably includes a brake lever pivotally coupled thereto to control the front brake mechanism 26 in a conventional manner.

Since the various parts of the bicycle 10 are conventional, except for the rear derailleur 12, the remaining parts of the bicycle 10 will not be discussed or illustrated in detail herein, except as they relate to the rear derailleur 12. Moreover, it will be apparent to those skilled in the art from this disclosure that various modifications can be made to the various components or parts of the bicycle 10 without departing from the scope of the present invention.

As used herein, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

Referring now to FIGS. 2–7, the rear derailleur 12 basically includes a base member 30, a movable member 32, a linkage assembly 34, a chain guide 36 and a biasing member or spring 38. Generally, the base member 30 is fixedly coupled to frame 11 for limited rotational movement, while the movable member 32 is movably coupled to the base member 30 via the linkage assembly 34. The chain guide 36 is pivotally coupled to the movable member 32. The biasing member or spring 38 normally biases the chain guide 36 to the inner most (largest) of the rear sprockets RS. The base member 30 forms a first member adapted to be coupled to the frame 11. The movable member 32, linkage assembly 34, chain guide 36 and biasing member 38 form parts of a second member that is movable coupled relative to the first member (base member 30).

The rear derailleur 12 is basically identical to the rear derailleur of the Saint™ component group available from Shimano, Inc., except the rear derailleur 12 of the present invention is equipped with the control cable fixing device 13 in accordance with the present invention rather than a conventional cable fixing device. Thus, the basic operation of rear derailleur 12 is well known in the prior art. Therefore, the rear derailleur 12 will not be discussed or illustrated in detail herein, except as related to the control cable fixing device 13.

Referring still to FIGS. 2–7, the base member 30 is illustrated as being constructed of two parts that are coupled to the frame 11 via the hub of the rear wheel 18. However, it will be apparent to those skilled in the art from this disclosure that the base member 30 can be constructed as one part and/or can be coupled directly to the frame 11 separately of the hub of the rear wheel 18 in a conventional manner. Moreover, it will be apparent to those skilled in the art from this disclosure that the base member 30 can be coupled to the frame 11 via removable derailleur hanger or hanging plate (not shown) in a conventional manner. In any case, the base member 30 (i.e., a first member) is coupled to the frame 11 for limited rotational movement.

The base member 30 includes a cable housing receiving recess 40 adapted to receive part of the rear shift control cable 14. Specifically, the rear shift control cable 14 includes an inner wire 14a and an outer casing or sheath 14b in a conventional manner. The cable housing receiving recess 40 has an abutment surface 40a and a through hole 40b. The inner wire 14a of the control cable 14 extends through the through hole 40b, while the outer casing 14b is partially received in the cable housing recess 40 such that the outer casing 14b contacts the abutment surface 40a in a conventional manner. The end of the inner wire 14a that extends through the through hole 40b is non-movably fixed/retained by the control cable fixing device 13 of the present invention, as explained below in more detail.

Figure 6:
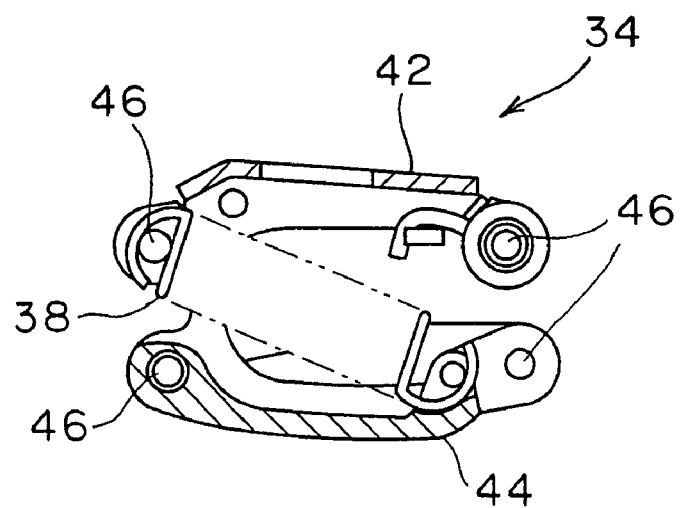
FIG. 6 is a partial, cross-sectional view of the portions of the rear derailleur illustrated in FIG. 5, as viewed along section line 6—6 of FIG. 5.
Figure 7:
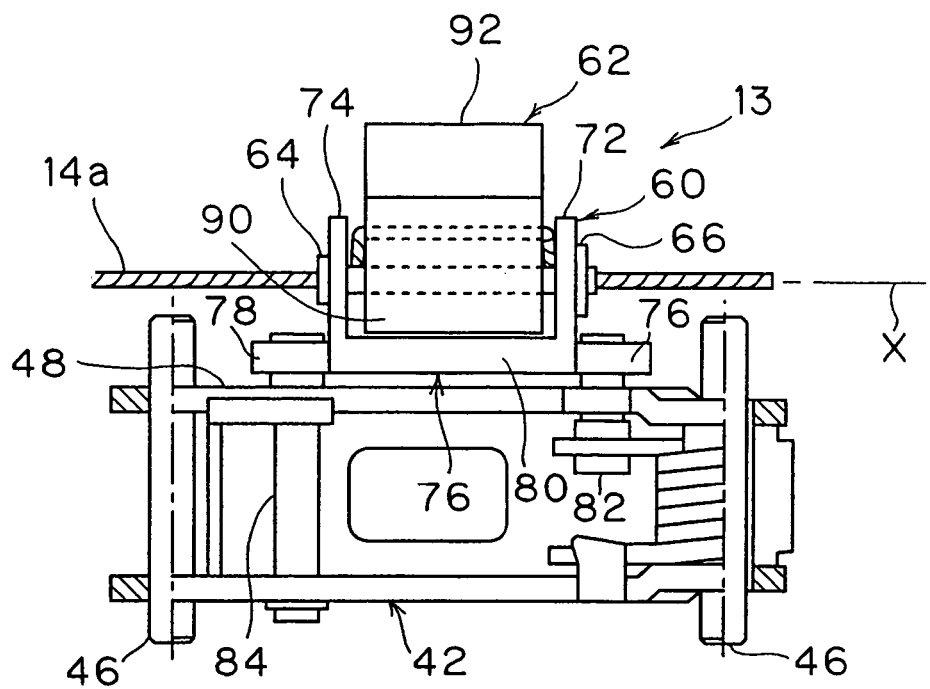
FIG. 7 is a partial, cross-sectional view of the linkage assembly of the rear derailleur illustrated in FIGS. 2–6, the control cable fixing device coupled to the inner link of the linkage assembly.

The linkage assembly 34 includes a pair of links 42 and 44 that are pivotally coupled at first ends to the base member 30 and pivotally coupled at their other ends to the movable member 32. Four pins 46 are used to pivotally couple the links 42 and 44 to the base member 30 and the movable member 32. The biasing member 38 (i.e., a coil spring) is coupled between the links 42 and 44 for biasing the chain guide 36 in one direction as best seen in FIG. 6, while the inner wire moves the chain guide in the other direction to locate the chain guide 36 in the correct gear position in a conventional manner. In the illustrated embodiment, the link 42 is an inner link that is located closer to the center plane of the bicycle 10 than the (outer) link 44. The links 42 and 44 are inclined relative to the center plane of the bicycle 10 such that the link 42 is a lower link and the link 44 is an upper link.

The control cable fixing device 13 of the present invention is coupled to a substantially upper side of the linkage assembly 34 to move the chain guide 36 against the biasing force of the spring 38. Specifically, the control cable fixing device 13 is preferably coupled to an upwardly/inwardly facing surface 48 of the inner/lower link 42. Accordingly, when the rider operates the rear shift control mechanism 20 to pull the inner wire 14a of shift control cable 14, this will cause links 42 and 44 to pivot outwardly relative to the base member 30 against the bias of the coil spring 38 and will cause the movable member 32 and the chain guide 36 to move outwardly away from the center of the bicycle 10. This in turn will cause the chain C to move from an inner (larger) gear of the sprockets RS to the next outer (smaller) gear of the sprockets RS in a conventional manner. Of course, if the rear shift control mechanism 20 is moved to release the inner wire 14a of the shift cable 14, the spring 38 will move the linkage members 42 and 44 such that the chain guide 36 will move the chain C inwardly from a smaller (outer) gear to a larger (inner) gear in a conventional manner.

Referring again to FIGS. 2–4, the chain guide 26 is movably supported on the movable member 32. The chain guide 36 basically has a pair of guide plates 50 and 52 with a pair of sprockets or pulleys 54 and 56 rotatably coupled between the guide plates 50 and 52 in a conventional manner. The sprockets 54 and 56 engage chain C in a conventional manner. The sprocket 54 is an upper, guide sprocket, while the sprocket 56 is a lower, tension sprocket in a conventional manner. Since the chain guide 36 is conventional, the chain guide 36 will not be discussed and/or illustrated in detail herein.

Figure 8:
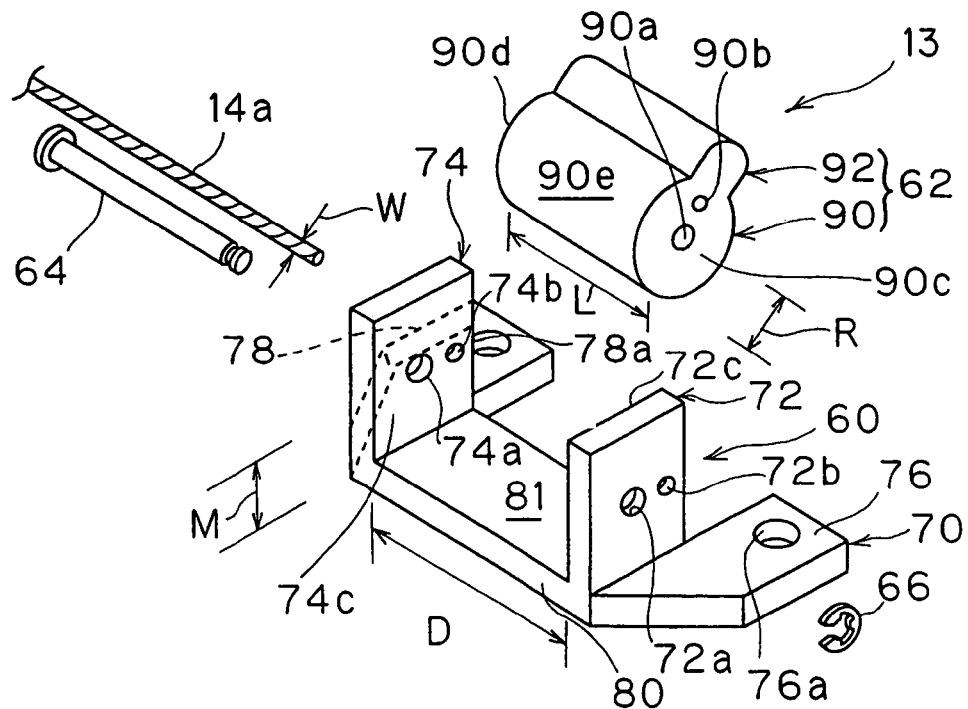
FIG. 8 is an exploded, enlarged perspective view of the control cable fixing device illustrated in FIG. 7.

Referring now to FIGS. 2–14, the control cable fixing device 13 of the present invention will be explained in more detail. The control cable fixing device 13 of the present invention basically includes a support member or structure 60, a cable fixing member or structure 62, a pivot pin 64 and a c-clip 66 as best seen in FIG. 8. The cable fixing member 62 is preferably non-threadedly supported on the support member 60 to rotate about a rotation axis X. Specifically, the cable fixing member 62 is preferably freely rotatably mounted on the pivot pint 64. The cable fixing member 62 and the support member 60 are arranged and configured such that the inner wire 14a of the control cable 14 is secured therebetween in response to rotational movement of the cable fixing member 62 to a cable fixing position (FIG. 12) from a cable release position (FIG. 9), as explained below in more detail.

The support member 60 is preferably constructed of a lightweight, rigid material such as a metallic material. The support member 60 basically includes a base portion 70, a first mounting portion 72 and a second mounting portion 74. The first and second mounting portions 72 and 74 are axially spaced from each other, and extend upwardly/inwardly from the base portion 70 when the support member 60 is mounted on the upper surface 48 of the inner link 42. The cable fixing member 62 is rotatably mounted between the first and second mounting portions 72 and 74 via the pivot pin 64.

Specifically, the first mounting portion 72 includes a first pin receiving hole 72a, a first wire receiving hole 72b and a first axially facing retaining surface 72c, while the second mounting portion 74 includes a second pin receiving hole 74a, a second wire receiving hole 74b and a second axially facing retaining surface 74c. The pivot pin 64 is retained in the first and second pin receiving holes 72a and 74a by the c-clip 66 to rotatably support the cable fixing member 62. Thus, the rotation axis X is centered in the first and second pin receiving holes 72a and 74a. The first and second axially facing surfaces 72c and 74c are opposed to each other (i.e., face each other along the rotation axis X). In the illustrated embodiment, the axially facing surfaces 72c and 74c are preferably planar surfaces that are substantially parallel to each other.

The base portion 70 basically includes a first connection section 76 with a first attachment opening 76a, a second connection section 78 with a second attachment opening 78a and an elongated central section 80 with an upper surface 81. The central section 80 is arranged between the first and second mounting portions 72 and 74. The first and second connection sections 76 and 78 extend in opposite axial directions from the first and second mounting portions 72 and 74. Moreover, the first and second connection sections 76 and 78 extend in opposite axial directions from the center section 80. In the illustrated embodiment, the upper surface 81 is preferably a planar surface substantially perpendicular to the axially facing surfaces 72c and 74c.

The first and second connection sections 76 and 78 also extend laterally from the first and second mounting portions 72 and 74 and the center section 80 such that the first and second attachment openings 76a and 78a of the first and second connection sections 76 and 78 are laterally offset from the first and second mounting portions 72 and 74, respectively. The first and second attachment openings 76a and 78a receive first and second attachment pins 82 and 84 to couple the support member 60 to the upper surface 48 of the inner link 42. Thus, the rotation axis X is laterally offset toward the outer link 44 from the attachment pins 82 and 84.

Preferably, the first and second mounting portions 72 and 74, the first and second connection sections 76 and 78 and the center section 80 are integrally formed together as a one-piece, unitary metallic member. However, it will be apparent to those skilled in the art from this disclosure that these parts can be constructed of several pieces fixedly coupled together as needed and/or desired, as discussed below in another embodiment of the present invention. In any case, the first and second mounting portions 72 and 74 preferably extend outwardly from the base portion 70 having the upper surface 81 (i.e., of the central section 80). The upper surface 81 is designed to cooperate with the cable fixing member 62 to retain the cable fixing member 62 in the cable fixing position (FIGS. 7 and 12–14), as explained below in more detail.

Referring still to FIGS. 2–14, the cable fixing member 62 will now be discussed in more detail. The cable fixing member 62 is preferably constructed of a lightweight, rigid material such as a metallic material. The cable fixing member 62 basically includes a cam portion 90 and a lever portion 92 extending radially outwardly from the cam portion 90 relative to the rotation axis X. Preferably, the cam portion 90 and the lever portion 92 are elongated in the axial direction. Moreover, the cam portion 90 and the lever portion 92 are preferably integrally formed together as a one-piece, unitary member. However, it will be apparent to those skilled in the art from this disclosure that the cable fixing member 62 can have other configurations as needed and/or desired. For example, as seen from the two embodiments of the present invention illustrated herein, it should be apparent to those skilled in the art from this disclosure that the terms "member" or "structure" refer to parts that can be constructed of one or more pieces (e.g., the support member 60 and/or the cable fixing member 62 could be constructed of two or more separate pieces) if needed and/or desired.

The cam portion 90 includes a pin receiving bore 90a, a wire receiving bore 90b, a first axial end surface 90c, a second axial end surface 90d and a peripheral cam surface 90e extending between the axial end surfaces 90c and 90d. The cam portion 90 has an axial length L measured between the axial end surfaces 90c and 90d that is smaller than a distance D measured between the first and second axially facing surfaces 72c and 74c. In particular, the axial length L is preferably equal to approximately (D−2W) or slightly larger than approximately (D−2W). W is the width of the inner wire 14a. Thus, the inner wire 14a can be received in the wire receiving holes 72b and 74b as well as the wire receiving bore 90b when the cable fixing member 62 is moved to the cable fixing position (FIGS. 12–14) from the cable release position (FIGS. 9–11), as explained below in more detail.

The pin receiving bore 90a is aligned with the pin receiving holes 72a and 74a of the first and second mounting portions 72 and 74, respectively. Thus, the pivot pin 64 can be received and retained in the pin receiving bore 90a and the pin receiving holes 72a and 74a of the first and second mounting portions 72 and 74, respectively. Specifically, the pivot pin 64 includes an enlarged head to retain one end, while the c-clip 66 is mounted in a groove at the other end to prevent removal of the pivot pin 64 in a conventional manner. The center axis of the pivot pin 64 forms the rotation axis X of the cable fixing member 62.

Figure 9:
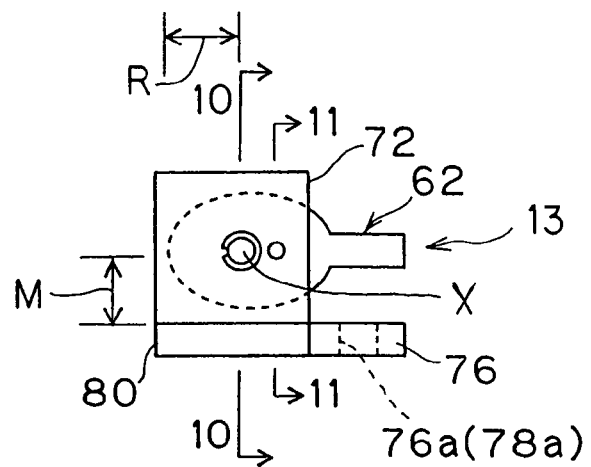
FIG. 9 is an end elevational view of the control cable fixing device illustrated in FIGS. 7 and 8, with the cable fixing member in a cable release position.
Figure 10:
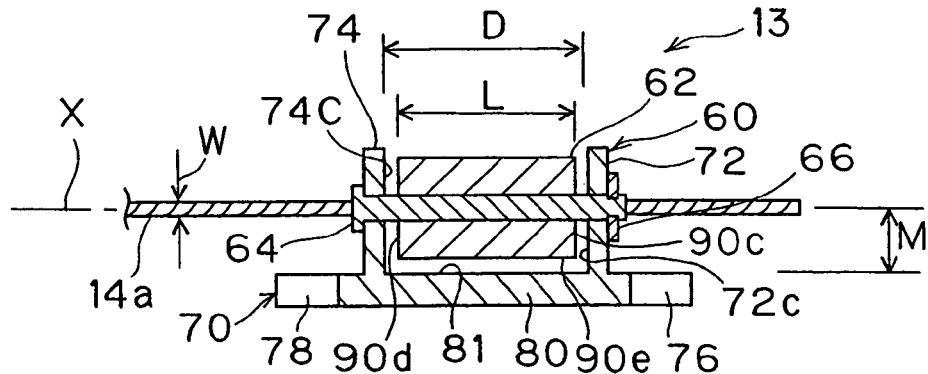
FIG. 10 is a cross-sectional view of the control cable fixing device illustrated in FIG. 9, as viewed along section line 10—10 of FIG. 9.
Figure 11:
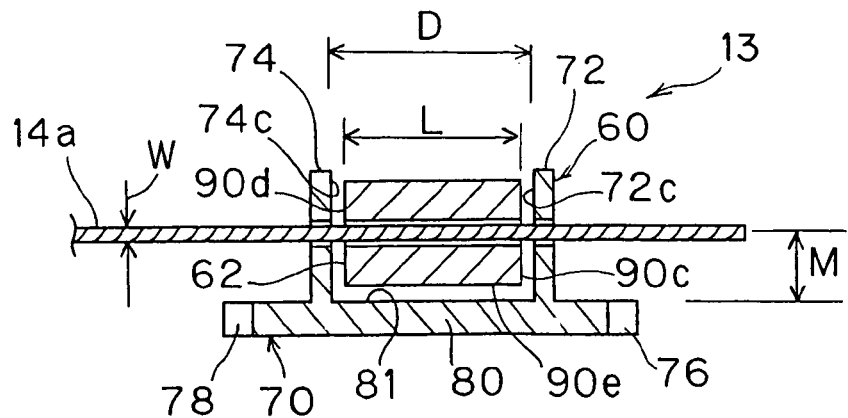
FIG. 11 is a cross-sectional view of the control cable fixing device illustrated in FIGS. 9 and 10, as viewed along section line 11—11 of FIG. 9.

The wire receiving bore 90b is configured to be aligned with the wire receiving holes 72b and 74b when the cable fixing member 62 is in the cable release position (FIGS. 9–11). Specifically, the wire receiving holes 72b and 74b are preferably aligned with each other and spaced laterally to one side of the pin receiving holes 72a and 74a. Similarly, the wire receiving bore 90b is also arranged laterally to one side of the pin receiving bore 90a when the cable fixing member 62 is arranged in the cable release position. The inner wire is freely (slidably) threaded through the wire receiving hole 74b, the wire receiving bore 90b and the wire receiving hole 72b when the cable fixing member 62 is located in the cable release position. The cable fixing member 62 is then rotated to fixedly secure the inner wire 14a to the control cable fixing device 13.

Specifically, when the cable fixing member 62 is moved to the cable fixing position (FIGS. 12–14), the wire receiving bore 90b is offset from the wire receiving holes 72b and 74b. Due to the arrangement of the bore 90b, the holes 72b and 74b, the dimension D between the surfaces 72c and 74c, the axial length L of the cam portion 90 and the width W of the inner wire 14a, the inner wire 14a is preferably secured between the support member 60 and the cable fixing member 62. More specifically, because the wire 14a must bend (i.e. zigzag) through the holes 72b, the bore 90b and the hole 74b, the wire 14a is preferably at least partially squeezed between the axial surfaces 72c and 90c, and between the axial surfaces 74c and 90d. Thus, the inner wire 14a is preferably frictionally prevented from moving axially. This frictional engagement between the inner wire 14a, the support member 60 and the cable fixing member 62 also aids in retaining the cable fixing member 62 in the cable fixing position.

Figure 12:
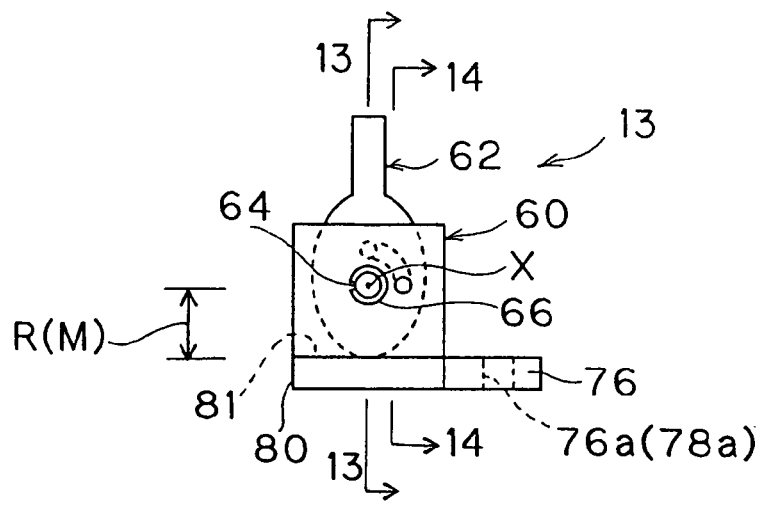
FIG. 12 is an end elevational view of the control cable fixing device illustrated in FIGS. 7–11, with the cable fixing member in a cable fixing position.
Figure 13:
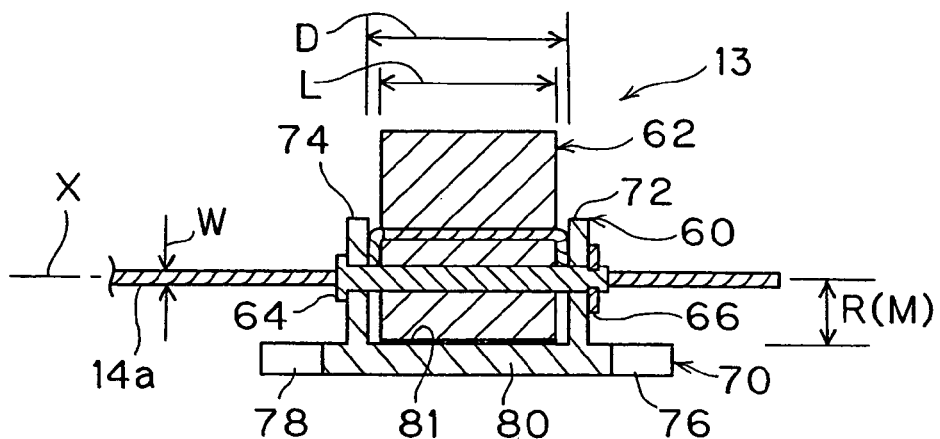
FIG. 13 is a cross-sectional view of the control cable fixing device illustrated in FIG. 12, as viewed along section line 13—13 of FIG. 12.
Figure 14:
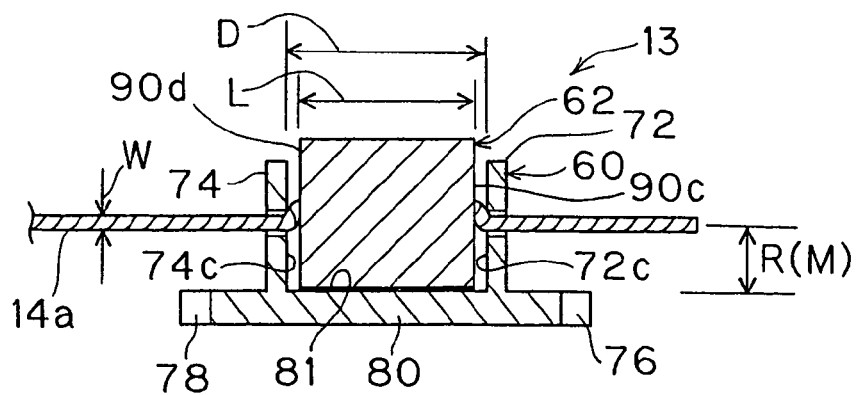
FIG. 14 is a cross-sectional view of the control cable fixing device illustrated in FIGS. 12 and 13, as viewed along section line 14—14 of FIG. 12.
Figure 15:
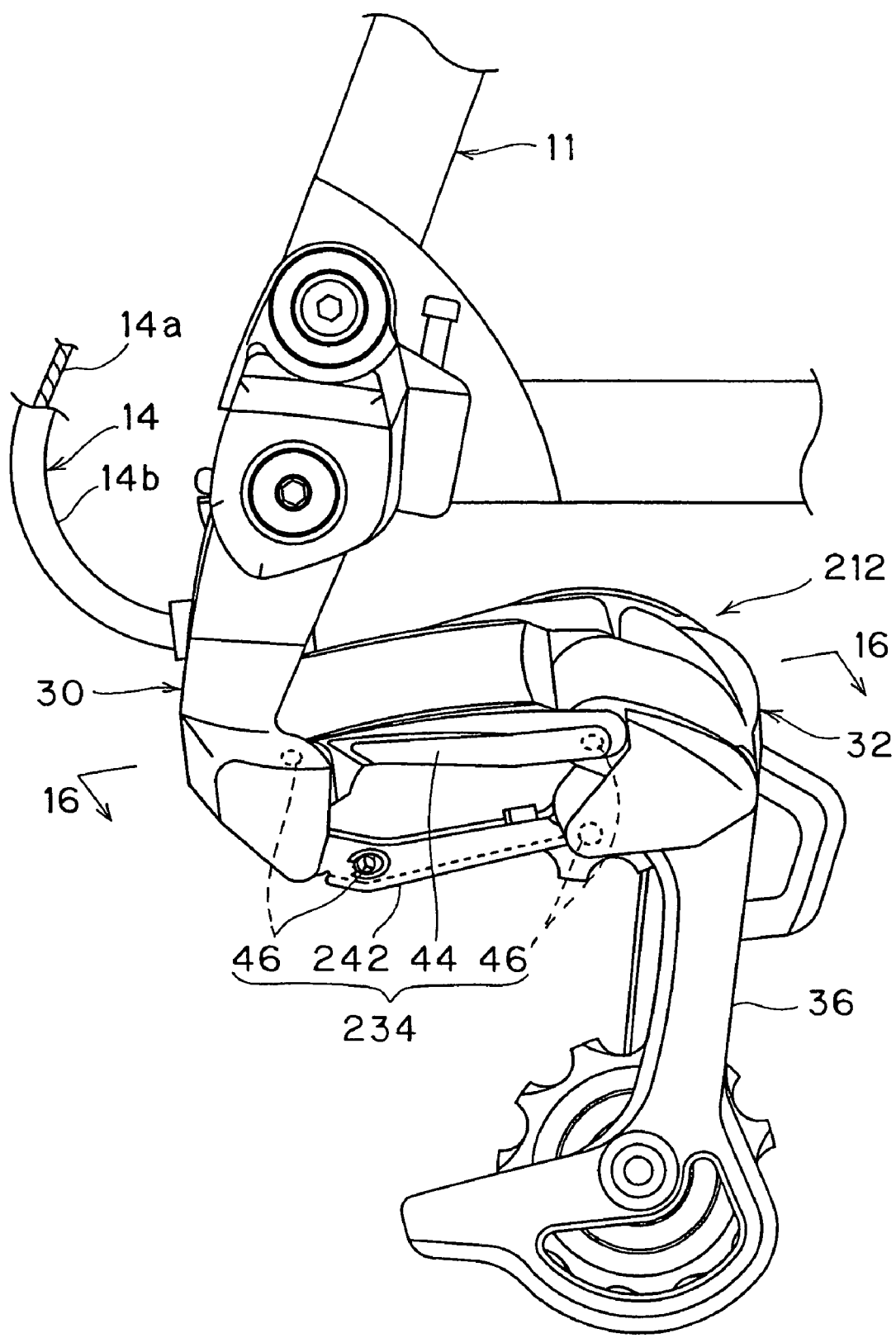
FIG. 15 is an enlarged, side elevational view of a rear derailleur (component) having a control cable fixing device in accordance with a second embodiment of the present invention.
Figure 16:
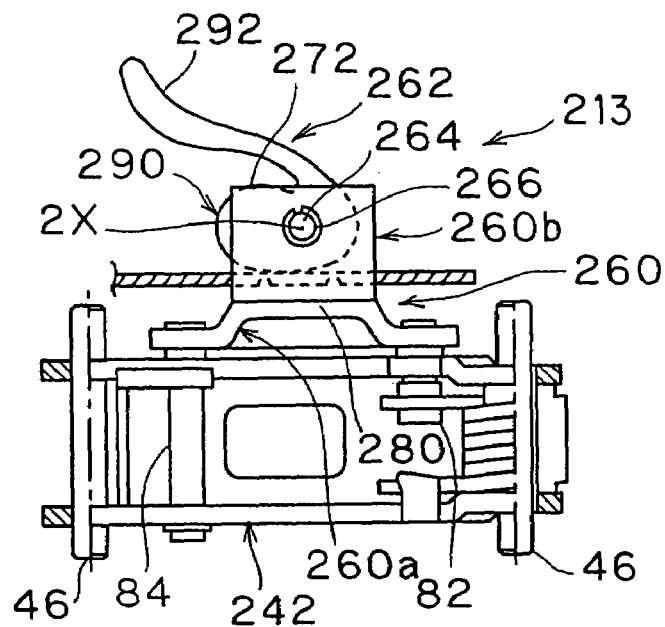
FIG. 16 is a partial, cross-sectional view of the linkage assembly of the rear derailleur illustrated in FIG. 15 with the control cable fixing device coupled to the inner link of the linkage assembly, as viewed along section line 16—16 of FIG. 15 (i.e., a view like that of FIG. 7 of the first embodiment)
Figure 17:
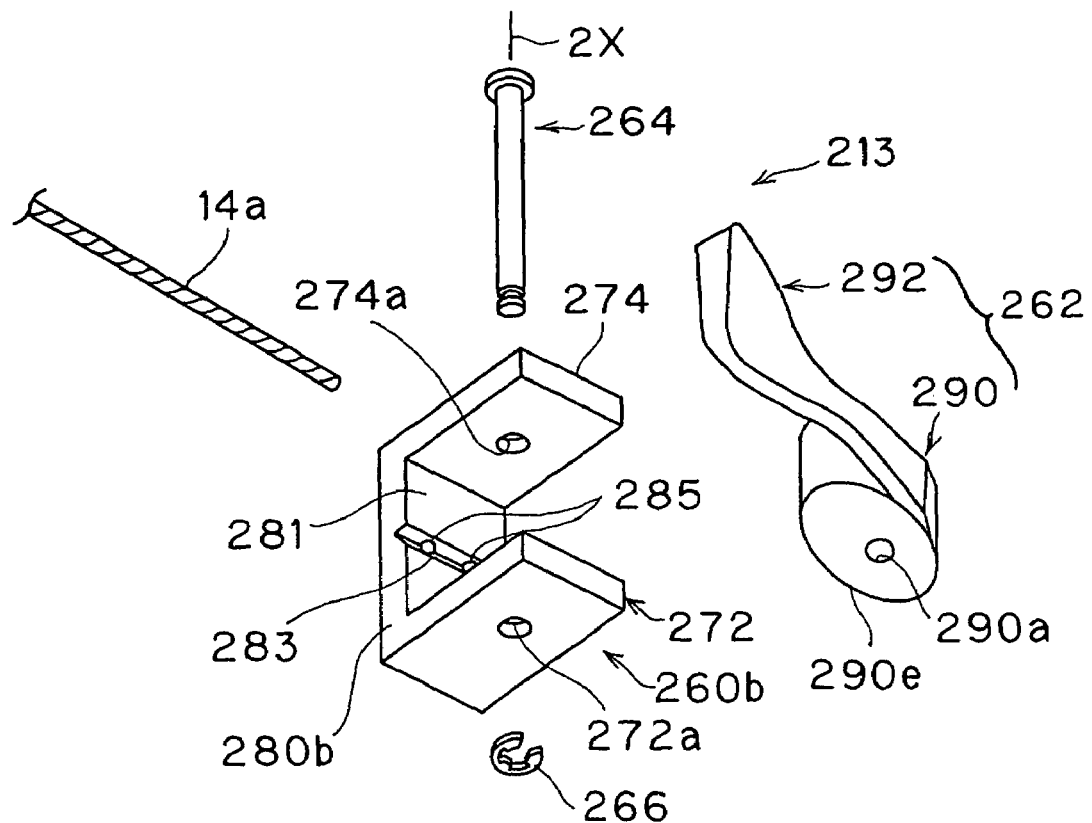
FIG. 17 is an exploded, enlarged perspective view of the control cable fixing device illustrated in FIG. 16.

The peripheral cam surface 90e is concentric about the rotation axis X. Preferably, the cam portion 90 has a substantially oval shaped as viewed along the rotation axis X. Moreover, the cam portion 90 preferably has a substantially constant cross-sectional profile along its entire axial length. Thus, the peripheral cam surface 90e is normally spaced from the upper surface 81 of the support member 60 when the cable fixing member 62 is in the cable release position (FIGS. 9–11). However, due to the eccentric shape of the cam portion 90, the peripheral cam surface 90e contacts the upper surface 81 of the support member 60 when the cable fixing member 62 is in the cable fixing position (FIGS. 12–14).

The peripheral cam surface 90e preferably has a maximum radial dimension R that is slightly larger than a distance M measured between the rotation axis X and the upper surface 81. Accordingly, when the cable fixing member 62 is rotated to the cable fixing position from the cable release position, the peripheral cam surface 90e contacts and frictionally engages the upper surface 81 to retain/secure the cable fixing member 62 in the cable fixing position. Thus, the cable fixing member 62 is freely rotatably mounted on the pivot pin 64, except when the peripheral cam surface 90e contacts the upper surface 81 of the support member 60.

The lever portion 92 is an elongated member that extends radially outwardly from the cam portion 90 relative to the rotation axis X. The lever portion 92 is arranged and configured to be manually operable using the human hand. In particular, the lever portion 92 is designed to provide a mechanical advantage such that the cable fixing member 62 can be rotated by the human hand from the cable release position to the cable fixing position to securely retain the inner wire 14a to the cable fixing device 13. Moreover, the lever portion 92 is preferably arranged and configured to avoid contact with debris during riding. Specifically, the lever portion 92 is preferably arranged upwardly and inwardly relative to the linkage assembly 34.

In this embodiment, the axially facing surfaces 72c and 74c of the mounting portions 72 and 74 can be considered first cable engagement surfaces or cable support surfaces of the support member or structure 60, while the axial end surfaces 90c and 90d of the cam portion 90 can be considered second cable engagement surfaces or cable pressing surfaces of the cable fixing member or structure 62. Additionally, in this embodiment, the upper surface 81 can be considered a peripheral retaining surface disposed relative to the peripheral cam surface 90e to retain the cable fixing member 62 in the cable fixing position. In this embodiment, the inner wire 14a is substantially parallel to the rotation axis X. However, it will be apparent to those skilled in the art from this disclosure that other arrangements are possible, such as the inner wire being perpendicular to the rotation.

Second Embodiment

Referring now to FIGS. 15–21, a rear derailleur 212 with a modified control cable fixing device 213 is illustrated in accordance with a second embodiment of the present invention. The rear derailleur 212 of this second embodiment is identical to the rear derailleur 12 of the first embodiment, except the rear derailleur 212 has the modified control cable fixing device 213 mounted in place of the control cable fixing device 13 of the first embodiment. In view of the similarities between the first and second embodiments, the parts of the second embodiment that are identical to the parts of the first embodiment will be given the same reference numerals as the parts of the first embodiment. Moreover, the descriptions and illustrations of the parts of the second embodiment that are identical to the parts of the first embodiment will be omitted for the sake of brevity. However, it will be apparent to those skilled in the art from this disclosure that the descriptions and illustrations of the first embodiment also apply to this second embodiment, except as explained and/or illustrated herein.

The rear derailleur 212 basically includes a base member 30, a movable member 32, a modified linkage assembly 234, a chain guide 36 and a biasing member 38 (not shown in this embodiment). The modified linkage assembly 234 is identical to the linkage assembly 34 of the first embodiment, except the modified linkage assembly 234 includes a modified inner link 242 with the modified control cable fixing device 213 coupled thereto in place of the control cable fixing device 13 of the first embodiment. The inner link 242 is identical to the inner link 42 of the first embodiment, except the modified control cable fixing device 213 is coupled thereto. Accordingly, the linkage assembly 234 will not be discussed and/or illustrated in detail herein, except as related to the control cable fixing device 213.

The control cable fixing device 213 basically includes a support member 260, a cable fixing member 262, a pivot pin 264 and a c-clip 266. The cable fixing member 262 is preferably non-threadedly supported on the support member 260 to rotate about a rotation axis 2X. Specifically, the cable fixing member 262 is preferably freely rotatably mounted on the pivot pint 264. The cable fixing member 262 and the support member 260 are arranged and configured such that the inner wire 14a of the control cable 14 is secured therebetween in response to rotational movement of the cable fixing member 262 to a cable fixing position (FIG. 19) from a cable release position (FIG. 18), as explained below in more detail.

The support member 260 is preferably constructed of a lightweight, rigid material such as a metallic material. The support member 260 basically includes a base portion 270, a first mounting portion 272 and a second mounting portion 274. The first and second mounting portions 272 and 274 are laterally spaced from each other, and extend upwardly/inwardly from the base portion 270 when the support member 260 is mounted on the inner link 242. The cable fixing member 262 is rotatably mounted between the first and second mounting portions 272 and 274 via the pivot pin 264.

Specifically, the first mounting portion 272 includes a first pin receiving hole 272a, while the second mounting portion 274 includes a second pin receiving hole 274a. The pivot pin 264 is retained in the first and second pin receiving holes 272a and 274a by the c-clip 266 to rotatably support the cable fixing member 262. Thus, the rotation axis 2X is centered in the first and second pin receiving holes 272a and 274a. In this embodiment, the rotation axis 2X is substantially perpendicular to the inner wire 14*a* that is coupled to the control cable fixing device 213.

The base portion 270 basically includes a first connection section 276 with a first attachment opening 276*a*, a second connection section 278 with a second attachment opening 278*a* and a central section 280 with an upper surface 281. The first and second connection sections 276 and 278 extend in opposite axial directions from both the first and second mounting portions 272 and 274. Moreover, the first and second connection sections 276 and 278 extend in opposite axial directions from the center section 280. In the illustrated embodiment, the upper surface 281 is preferably a planar surface with a V-shaped groove 283 formed therein. The groove 283 extends in a direction perpendicular to the rotation axis 2X. The groove 283 is arranged and configured to at least partially receive the inner wire 14*a* therein.

The first and second connection sections 276 and 278 also extend laterally outwardly and downwardly from both the first and second mounting portions 272 and 274 and the center section 280 such that the first and second attachment openings 276*a* and 278*a* of the first and second connection sections 276 and 278 are laterally and vertically offset from the first and second mounting portions 272 and 274 and the center portion 280. The first and second attachment openings 276*a* and 278*a* receive first and second attachment pins 82 and 84 to couple the support member 260 to the inner link 242 in a manner identical to the first embodiment.

Preferably, the first and second mounting portions 272 and 274, the first and second connection sections 276 and 278 and the center section 280 are formed of two pieces 260*a* and 260*b* that are fixedly coupled together such as by welding or the like as best seen in FIGS. 16–21. Thus, lower and upper center elements 280*a* and 280*b* form the center section 280. However, it will be apparent to those skilled in the art from this disclosure that these parts can be constructed as a one-piece, unitary member as needed and/or desired. In any case, the first and second mounting portions 272 and 274 preferably extend outwardly from the base portion 270 having the upper surface 281 (i.e., of the central section 280). The upper surface 281 is designed to cooperate with the cable fixing member 262 to retain the cable fixing member 262 in the cable fixing position (FIG. 19), as explained below in more detail.

Referring still to FIGS. 15–21, the cable fixing member 262 will now be discussed in more detail. The cable fixing member 262 is preferably constructed of a lightweight, rigid material such as a metallic material. The cable fixing member 262 basically includes a cam portion 290 and a lever portion 292 extending radially outwardly from the cam portion 290 relative to the rotation axis 2X. Preferably, the cam portion 290 and the lever portion 292 are integrally formed together as a one-piece, unitary member. However, it will be apparent to those skilled in the art from this disclosure that the cable fixing member 262 can have other configurations as needed and/or desired.

The cam portion 290 includes a pin receiving bore 290*a*, and a peripheral cam surface 290*e*. The pin receiving bore 290*a* is aligned with the pin receiving holes 272*a* and 274*a* of the first and second mounting portions 272 and 274, respectively. Thus, the pivot pin 264 can be received and retained in the pin receiving bore 290*a* and the pin receiving holes 272*a* and 274*a* of the first and second mounting portions 272 and 274, respectively. The pivot pin 264 and the c-clip 266 are identical to the first embodiment, except the pivot pin 264 is shorter than the pin 64. The center axis of the pivot pin 264 forms the rotation axis 2X of the cable fixing member 262.

Figure 18:
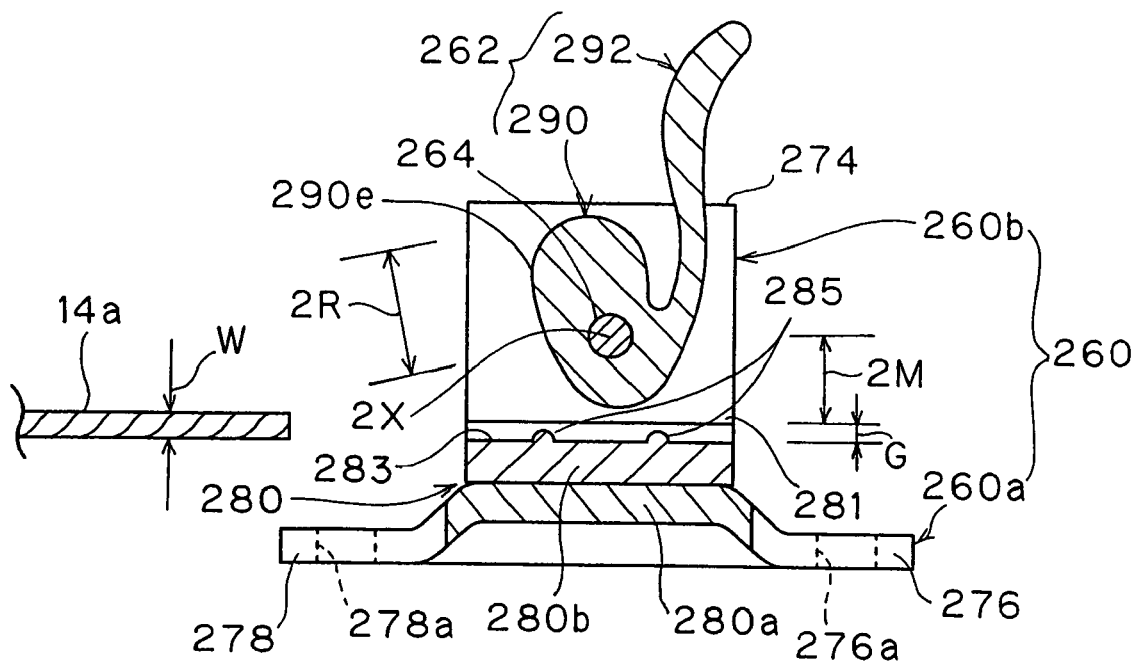
FIG. 18 is a cross-sectional view of the control cable fixing device illustrated in FIGS. 16 and 17 as viewed along a plane perpendicular to the pivot pin of FIG. 16 passing through the cable fixing member and the support member, with the cable fixing member in a cable release position prior to mounting the control cable between the cable fixing member and the support member.

The peripheral cam surface 290*e* is concentric about the rotation axis 2X. Preferably, the cam portion 290 has a substantially oval shaped as viewed along the rotation axis 2X. Moreover, the cam portion 290 preferably has a substantially constant cross-sectional profile along its entire axial length. Thus, the peripheral cam surface 290*e* is normally spaced from the upper surface 281 of the support member 260 when the cable fixing member 262 is in the cable release position (FIG. 18). On the other hand, due to the eccentric shape of the cam portion 290, the peripheral cam surface 290*e* would contact the upper surface 281 of the support member 260 when the cable fixing member 262 is rotated sufficiently (not shown).

Figure 19:
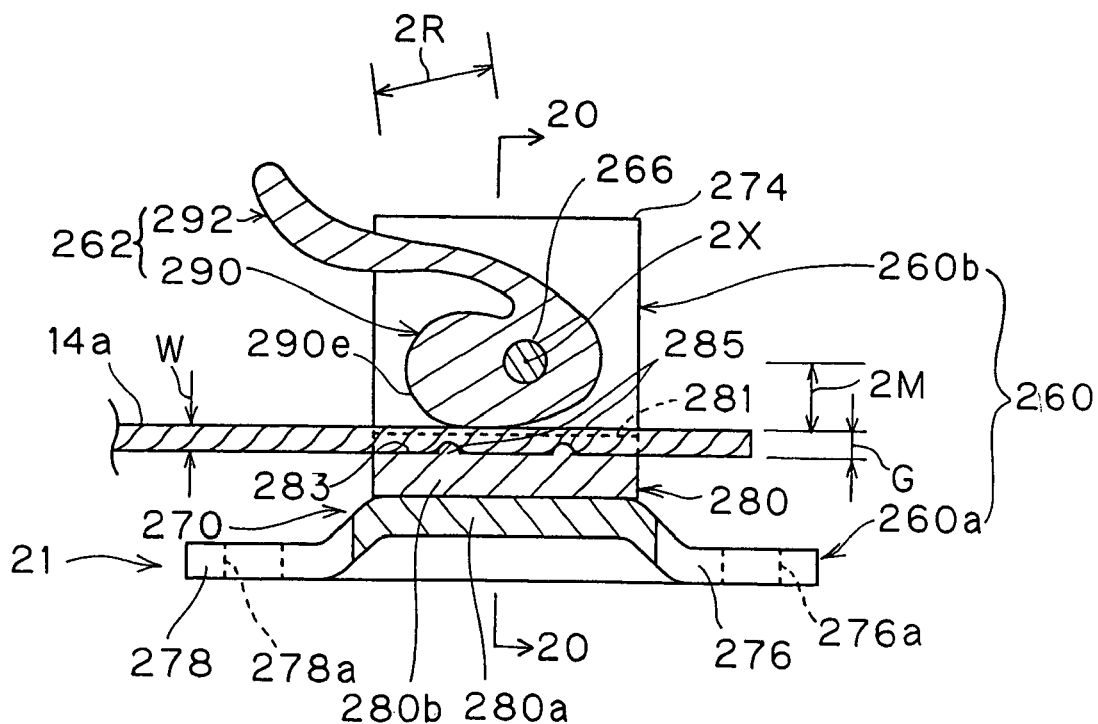
FIG. 19 is a cross-sectional view of the control cable fixing device illustrated in FIGS. 16 and 17 as viewed along a plane perpendicular to the pivot pin of FIG. 16 passing through the cable fixing member and the support member, with the cable fixing member in a cable fixing position with the control cable mounted between the cable fixing member and the support member.
Figure 20:
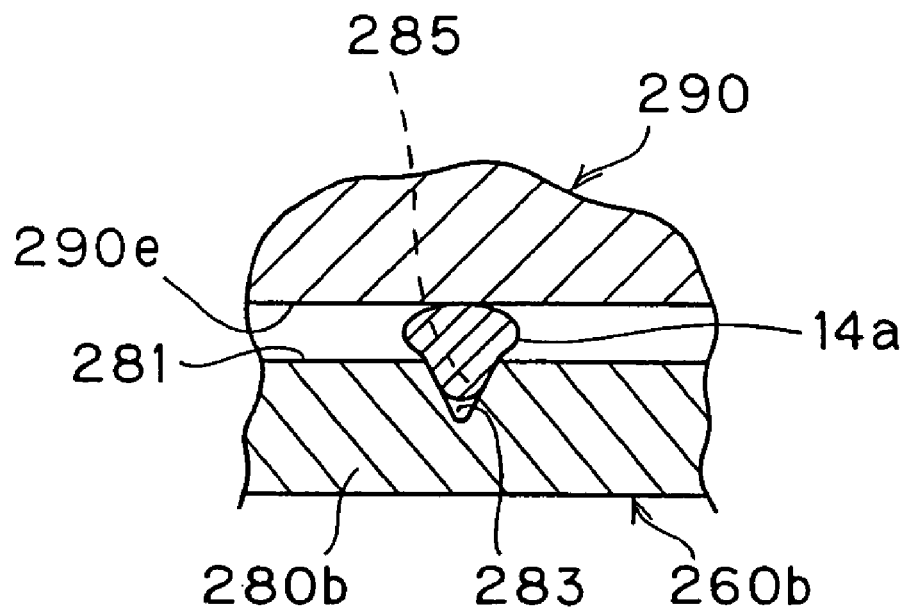
FIG. 20 is a further enlarged, partial cross-sectional view of the control cable fixing device illustrated in FIGS. 16–19, as viewed along section line 20—20 of FIG. 19.
Figure 21:
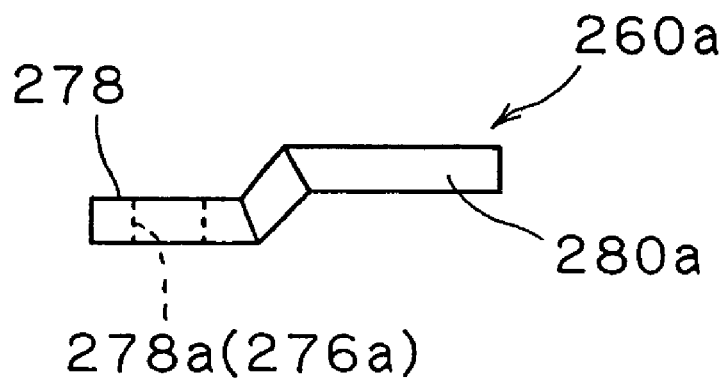
FIG. 21 is a side elevational view of the mounting plate of the control cable fixing device illustrated in FIGS. 16, 18 and 19, as viewed along arrow 21 of FIG. 19.

However, the groove 283 preferably has a depth G that is smaller than the thickness W of the inner wire 14*a*. Because the inner wire 14*a* is mounted in the groove 283 between the support member 260 and the cable fixing member 262, the cable fixing member 262 is only rotated until the inner wire 14*a* is sufficiently retained (squeezed) between the cable fixing member 262 and the support member 260 in the cable fixing position (FIGS. 19 and 20). Preferably, the groove 283 includes a pair of semi-circular shaped, transverse humps 285 to assist in retaining the inner wire 14*a*.

The peripheral cam surface 290*e* preferably has a maximum radial dimension 2R that is larger than a distance 2M measured between the rotation axis 2X and the upper surface 281. Accordingly, when the cable fixing member 262 is rotated to the cable fixing position from the cable release position, the peripheral cam surface 290*e* contacts and frictionally engages the inner wire 14*a* to retain/secure the cable fixing member 262 in the cable fixing position. Thus, the cable fixing member 262 is freely rotatably mounted on the pivot pin 264, except when the peripheral cam surface 290*e* contacts the inner wire 14*a*.

The lever portion 292 is an elongated member that extends radially outwardly from the cam portion 290 relative to the rotation axis 2X. The lever portion 292 is arranged and configured to be manually operable using the human hand. In particular, the lever portion 292 is designed to provide a mechanical advantage and to avoid contact with debris during riding in a manner substantially identical to the first embodiment. Specifically, the lever portion 292 is preferably arranged upwardly and inwardly relative to the linkage assembly 234.

In this embodiment, the upper surface 281 with the groove 283 can be considered a first cable engagement surface or cable support surface of the support member or structure 260, while the peripheral cam surface 290*e* can be considered a second cable engagement surface or cable pressing surface of the cable fixing member or structure 262. Additionally, in this embodiment, the upper surface 281 with the groove 283 can be considered a peripheral retaining surface disposed relative to the peripheral cam surface 290*e* to retain the cable fixing member 262 in the cable fixing position. In this embodiment, the inner wire 14*a* is substantially perpendicular to the rotation axis 2X.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle control cable fixing device adapted to be coupled to a bicycle component, said bicycle control cable fixing device comprising:
    a support structure having a cable support surface and at least one wire receiving hole; and
    a cable fixing structure non-threadedly supported on said support structure to rotate about a rotation axis, said cable fixing structure having a cable pressing surface and a wire receiving bore,
    said cable fixing structure and said support structure being arranged and configured such that an inner wire of a bicycle control cable is secured between said cable support surface and said cable pressing surface in response to rotational movement of said cable fixing structure to a cable fixing position from a cable release position,
    said wire receiving bore of said cable fixing structure being aligned with said wire receiving hole of said support structure when said cable fixing structure is in said cable release position to receive the inner wire therein, and
    said wire receiving bore of said cable fixing structure being offset from said wire receiving hole of said support structure when said cable fixing structure is in said cable fixing position in order to secure the inner wire.

2. The bicycle control cable fixing device according to claim 1, wherein
    said cable fixing structure includes a cam portion rotatably supported by said support structure and an elongated lever portion extending radially outwardly from said cam portion relative to said rotation axis.

3. The bicycle control cable fixing device according to claim 2, wherein
    said cable pressing surface is formed on said cam portion.

4. The bicycle control cable fixing device according to claim 2, wherein
    said cam portion includes a peripheral cam surface concentrically arranged relative to said rotation axis, and said cable pressing surface is formed on a surface of said cable fixing structure other than the peripheral cam surface.

5. The bicycle control cable fixing device according to claim 2, wherein
    said support structure includes a base portion adapted to be coupled to the bicycle component and a pair of axially spaced mounting portions extending from said base portion with said cam portion of said cable fixing structure rotatably supported between said mounting portions.

6. The bicycle control cable fixing device according to claim 5, wherein
    said cam portion includes a pair of axial end surfaces and a peripheral cam surface concentrically arranged relative to said rotation axis and extending between said axial end surfaces, and
    said base portion includes a peripheral retaining surface disposed relative to said peripheral cam surface to retain said cable fixing structure relative to said support structure when in said cable fixing position and the inner wire is retained between said support structure and said cable fixing structure.

7. The bicycle control cable fixing device according to claim 6, wherein
    at least one of said mounting portions includes an axial retaining surface forming said cable support surface and disposed opposite to one of said axial end surfaces, which forms said cable pressing surface, said axial retaining surface being spaced from said axial end surface by a distance to squeeze the inner wire therebetween.

8. The bicycle control cable fixing device according to claim 7, wherein
    said peripheral cam surface is configured and arranged to contact said peripheral retaining surface when said cable fixing structure is located in said cable fixing position to frictionally prevent movement of said cable fixing structure about said rotation axis.

9. The bicycle control cable fixing device according to claim 7, wherein
    said cam portion is freely rotatably mounted on a pivot pin that extends between said mounting portions of said support structure.

10. The bicycle control cable fixing device according to claim 6, wherein
    each of said mounting portions of said support structure includes an axial retaining surface disposed opposite to one of said axial end surfaces of said cam portion, said axial retaining surfaces forming said cable support surface and said axial end surfaces forming said cable pressing surface.

11. A bicycle control cable fixing device adapted to be coupled to a bicycle component, said bicycle control cable fixing device comprising:
    a support structure including a base portion adapted to be coupled to the bicycle component, a pair of axially spaced mounting portions extending from said base portion and a cable support surface; and
    a cable fixing structure non-threadedly supported on said support structure to rotate about a rotation axis, said cable fixing structure including a cam portion rotatably supported between said mounting portions of said support structure, an elongated lever portion extending radially outwardly from said cam portion relative to said rotation axis and a cable pressing surface,
    said cable fixing structure and said support structure being arranged and configured such that an inner wire of a bicycle control cable is secured between said cable support surface and said cable pressing surface in response to rotational movement of said cable fixing structure to a cable fixing position from a cable release position,
    said cam portion including a pair of axial end surfaces and a peripheral cam surface concentrically arranged relative to said rotation axis and extending between said axial end surfaces, and said base portion including a peripheral retaining surface disposed relative to said peripheral cam surface to retain said cable fixing structure relative to said support structure when in said cable fixing position and the inner wire is retained between said support structure and said cable fixing structure,
    at least one of said mounting portions including an axial retaining surface forming said cable support surface and disposed opposite to one of said axial end surfaces, which forms said cable pressing surface, said axial retaining surface being spaced from said axial end surface by a distance to squeeze the inner wire therebetween, said peripheral cam surface being configured and arranged to contact said peripheral retaining surface when said cable fixing structure is located in said cable fixing position to frictionally prevent movement of said cable fixing structure about said rotation axis, and said at least one of said mounting portions having said axial retaining surface includes a wire receiving hole that is offset from said rotation axis, and said cam portion includes a wire receiving bore that is aligned with said wire receiving hole when said cable fixing structure is located in said cable release position.

12. The A bicycle control cable fixing device adapted to be coupled to a bicycle component, said bicycle control cable fixing device comprising:

a support structure including a base portion adapted to be coupled to the bicycle component, a pair of axially spaced mounting portions extending from said base portion and a cable support surface; and a cable fixing structure non-threadedly supported on said support structure to rotate about a rotation axis, said cable fixing structure including a cam portion rotatably supported between said mounting portions of said support structure, an elongated lever portion extending radially outwardly from said cam portion relative to said rotation axis and a cable pressing surface, said cable fixing structure and said support structure being arranged and configured such that an inner wire of a bicycle control cable is secured between said cable support surface and said cable pressing surface in response to rotational movement of said cable fixing structure to a cable fixing position from a cable release position, said cam portion including a pair of axial end surfaces and a peripheral cam surface concentrically arranged relative to said rotation axis and extending between said axial end surfaces, and said base portion including a peripheral retaining surface disposed relative to said peripheral cam surface to retain said cable fixing structure relative to said support structure when in said cable fixing position and the inner wire is retained between said support structure and said cable fixing structure, each of said mounting portions of said support structure including an axial retaining surface disposed opposite to one of said axial end surfaces of said cam portion, said axial retaining surfaces forming said cable support surface and said axial end surfaces forming said cable pressing surface, and each of said mounting portions of said support structure including a wire receiving hole that is offset from said rotation axis, and said cam portion including a wire receiving bore that is aligned with said wire receiving holes when said cable fixing structure is located in said cable release position.

13. A bicycle component comprising:

a first member adapted to be coupled to a bicycle, said first member including a cable housing receiving recess adapted to receive an outer casing of a bicycle control cable; and a second member movably coupled relative to said first member, said second member including a bicycle control cable fixing device fixedly coupled thereto, said bicycle control cable fixing device configured to non-movably retain an inner wire of the bicycle control cable thereto such that movement of the inner wire moves said second member relative to said first member, said bicycle control cable fixing device including a support structure with a cable support surface, a cable fixing structure non-threadedly supported on said support structure to rotate about a rotation axis, said cable fixing structure having a cable pressing surface, said cable fixing structure and said support structure being arranged and configured such that the inner wire of the bicycle control cable is secured between said cable support surface and said cable pressing surface in response to rotational movement of said cable fixing structure.

14. The bicycle component according to claim 13, wherein said first member includes a base member configured to be mounted to a bicycle frame element, said second member includes a movable member with a linkage movably coupling said base member to said movable member, and a chain guide coupled to said movable member.

15. The bicycle component according to claim 14, wherein said linkage includes an inner link and an outer link with said bicycle control cable fixing device is fixedly coupled to a substantially upwardly facing surface of one of said inner and outer links relative to the bicycle in a normal riding position.

16. The bicycle component according to claim 13, wherein said cable fixing structure includes a cam portion rotatably supported by said support structure and an elongated lever portion extending radially outwardly from said cam portion relative to said rotation axis.

17. The bicycle component according to claim 16, wherein said support structure includes a base portion coupled to said second member and a pair of axially spaced mounting portions extending from said base portion with said cam portion of said cable fixing structure rotatably supported between said mounting portions.

18. The bicycle component according to claim 17, wherein said cam portion includes a pair of axial end surfaces and a peripheral cam surface concentrically arranged relative to said rotation axis and extending between said axial end surfaces, and said base portion includes a peripheral retaining surface disposed relative to said peripheral cam surface to retain said cable fixing structure relative to said support structure when in a cable fixing position and the inner wire is retained between said support structure and said cable fixing structure.

19. The bicycle component according to claim 18, wherein said peripheral retaining surface of said base portion includes said cable support surface, and said peripheral cam surface of said cam portion includes said cable pressing surface.

20. The bicycle component according to claim 19, wherein at least one of said peripheral retaining surface and said peripheral cam surface includes a groove adapted to at least partially receive the inner wire of the control cable therein.

21. The bicycle component according to claim 19, wherein
said peripheral retaining surface and said peripheral cam surface are arranged and configured to form a space therebetween when said cable fixing structure is located in said cable fixing position, said space being configured to be smaller than a transverse dimension of the inner wire of the control cable such that the inner wire is squeezed between said peripheral retaining surface and said peripheral cam surface to non-movably couple the inner wire to said bicycle control cable fixing device when said cable fixing structure is moved to said cable fixing position from a cable release position.

22. The bicycle component according to claim 19, wherein
said cam portion of said cable fixing structure is rotatably mounted on a pivot pin that extends between said mounting portions of said support structure.

23. The bicycle component according to claim 18, wherein
at least one of said mounting portions includes an axial retaining surface forming said cable support surface and disposed opposite to one of said axial end surfaces, which forms said cable pressing surface, said axial retaining surface being spaced from said axial end surface by a distance to squeeze the inner wire therebetween.

24. The bicycle component according to claim 23, wherein
said peripheral cam surface is configured and arranged to contact said peripheral retaining surface when said cable fixing structure is located in said cable fixing position to frictionally prevent movement of said cable fixing structure about said rotation axis.

25. The bicycle component according to claim 24, wherein
said at least one of said mounting portions having said axial retaining surface includes a wire receiving hole that is offset from said rotation axis, and
said cam portion includes a wire receiving bore that is aligned with said wire receiving hole when said cable fixing structure is located in a cable release position.

26. The bicycle component according to claim 23, wherein
said cam portion is freely rotatably mounted on a pivot pin that extends between said mounting portions of said support structure.

27. The bicycle component according to claim 18, wherein
each of said mounting portions of said support structure includes an axial retaining surface disposed opposite to one of said axial end surfaces of said cam portion, said axial retaining surfaces forming said cable support surface and said axial end surfaces forming said cable pressing surface.

28. The bicycle component according to claim 27, wherein
each of said mounting portions of said support structure includes a wire receiving hole that is offset from said rotation axis, and
said cam portion includes a wire receiving bore that is aligned with said wire receiving holes when said cable fixing structure is located in a cable release position.

29. The bicycle component according to claim 16, wherein
said cable pressing surface is formed on said cam portion.

30. The bicycle component according to claim 16, wherein
said cam portion includes a peripheral cam surface concentrically arranged relative to said rotation axis, and
said cable pressing surface is formed on a surface of said cable fixing structure other than the peripheral cam surface.

31. The bicycle component according to claim 13, wherein
said cable fixing structure includes a cam portion with a peripheral cam surface concentrically arranged relative to said rotation axis, said peripheral cam surface being configured and arranged to move said cable pressing surface toward said cable support surface when said cable fixing structure is moved from a cable release position toward a cable fixing position.

* * * * *